United States Patent
Zavalkovsky et al.

(10) Patent No.: US 7,096,260 B1
(45) Date of Patent: Aug. 22, 2006

(54) MARKING NETWORK DATA PACKETS WITH DIFFERENTIATED SERVICES CODEPOINTS BASED ON NETWORK LOAD

(75) Inventors: Arthur Zavalkovsky, Israel (IL); Itzhak Parnafes, Palo Alto, CA (US); Shai Mohaban, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 09/675,980

(22) Filed: Sep. 29, 2000

(51) Int. Cl.
G06F 15/173 (2006.01)
G06F 15/16 (2006.01)
G06F 11/00 (2006.01)

(52) U.S. Cl. .................. 709/223; 709/232; 370/232
(58) Field of Classification Search .............. 709/241, 709/200, 202, 224; 370/229, 230, 232, 238
See application file for complete search history.

(56) References Cited

U.S. PATENT DOCUMENTS

| | | | |
|---|---|---|---|
| 5,359,593 A * | 10/1994 | Derby et al. .............. 370/234 |
| 5,594,792 A | 1/1997 | Chouraki et al. |
| 5,751,964 A * | 5/1998 | Ordanic et al. ............ 709/224 |
| 5,928,331 A * | 7/1999 | Bushmitch ................ 709/231 |
| 5,968,176 A | 10/1999 | Nessett et al. |
| 5,970,064 A | 10/1999 | Clark et al. |
| 6,009,081 A | 12/1999 | Wheeler et al. |
| 6,021,263 A * | 2/2000 | Kujoory et al. ........... 709/232 |
| 6,021,439 A | 2/2000 | Turek et al. .............. 709/224 |
| 6,028,842 A * | 2/2000 | Chapman et al. .......... 370/235 |
| 6,046,980 A * | 4/2000 | Packer .................... 370/230 |
| 6,047,322 A | 4/2000 | Vaid et al. |
| 6,061,725 A | 5/2000 | Schwaller et al. |
| 6,104,700 A * | 8/2000 | Haddock et al. ........... 370/235 |
| 6,118,760 A | 9/2000 | Zaumen et al. ............ 370/229 |
| 6,154,776 A * | 11/2000 | Martin ..................... 709/226 |
| 6,167,445 A | 12/2000 | Gai et al. |
| 6,169,748 B1 | 1/2001 | Barbas et al. |
| 6,170,009 B1 | 1/2001 | Mandal et al. |
| 6,212,184 B1 | 4/2001 | Venkatachary et al. |
| 6,286,052 B1 | 9/2001 | McCloghrie et al. |
| 6,301,253 B1 | 10/2001 | Ichikawa .................. 370/395 |
| 6,301,613 B1 | 10/2001 | Ahlstrom et al. |

(Continued)

OTHER PUBLICATIONS

S. Blake, et al., "An Architecture for Differentiated Services," Dec. 1998, pp. 1-36.

(Continued)

*Primary Examiner*—Saleh Najjar
*Assistant Examiner*—Kevin Bates
(74) *Attorney, Agent, or Firm*—Hickman Palermo Truong & Becker LLP

(57) ABSTRACT

A method and apparatus for performing load-based packet marking within a network is described. In one aspect, a first group of one or more packets of a data flow are marked with a first behavioral treatment value that directs devices within the network to treat the first group of one or more packets with a first quality of service treatment. The bandwidth that is currently being achieved for the flow within the network is determined based on data traffic within the network. Based on the achieved flow bandwidth within the network a second behavioral treatment value is then determined. Thereafter, a second group of one or more packets of the data flow is marked with a second behavioral treatment value that directs devices within the network to treat the second group of one or more packets with a second quality of service treatment. The process of dynamically marking the packets for a particular data flow may be performed multiple times.

59 Claims, 5 Drawing Sheets

U.S. PATENT DOCUMENTS

| | | | |
|---|---|---|---|
| 6,324,184 B1 * | 11/2001 | Hou et al. | 370/468 |
| 6,327,618 B1 | 12/2001 | Ahlstrom et al. | |
| 6,363,429 B1 | 3/2002 | Ketcham | 709/235 |
| 6,393,473 B1 | 5/2002 | Chu | |
| 6,401,240 B1 | 6/2002 | Summers | |
| 6,424,659 B1 | 7/2002 | Viswanadham et al. | |
| 6,430,154 B1 | 8/2002 | Hunt et al. | |
| 6,438,106 B1 * | 8/2002 | Pillar et al. | 370/232 |
| 6,442,151 B1 | 8/2002 | H'mimy et al. | |
| 6,449,251 B1 * | 9/2002 | Awadallah et al. | 370/229 |
| 6,449,255 B1 * | 9/2002 | Waclawsky | 370/236 |
| 6,453,351 B1 * | 9/2002 | Endo | 709/229 |
| 6,459,682 B1 * | 10/2002 | Ellesson et al. | 370/235 |
| 6,463,470 B1 | 10/2002 | Mohaban et al. | |
| 6,466,984 B1 | 10/2002 | Naveh et al. | |
| 6,473,793 B1 * | 10/2002 | Dillon et al. | 709/223 |
| 6,483,805 B1 * | 11/2002 | Davies et al. | 370/235 |
| 6,484,261 B1 | 11/2002 | Wiegel | |
| 6,502,131 B1 * | 12/2002 | Vaid et al. | 709/224 |
| 6,539,425 B1 | 3/2003 | Stevens et al. | |
| 6,542,490 B1 * | 4/2003 | Ahmadvand et al. | 370/338 |
| 6,570,851 B1 * | 5/2003 | Koskelainen et al. | 370/231 |
| 6,570,875 B1 | 5/2003 | Hegde | |
| 6,577,644 B1 | 6/2003 | Chuah et al. | |
| 6,594,268 B1 | 7/2003 | Aukia et al. | |
| 6,594,277 B1 * | 7/2003 | Chiang et al. | 370/465 |
| 6,597,660 B1 * | 7/2003 | Rueda et al. | 370/230.1 |
| 6,601,082 B1 | 7/2003 | Durham et al. | |
| 6,611,864 B1 | 8/2003 | Putzolu et al. | |
| 6,621,793 B1 | 9/2003 | Widegren et al. | |
| 6,622,170 B1 | 9/2003 | Harrison et al. | |
| 6,651,191 B1 | 11/2003 | Vacante et al. | |
| 6,671,724 B1 * | 12/2003 | Pandya et al. | 709/226 |
| 6,684,244 B1 | 1/2004 | Goldman et al. | |
| 6,765,873 B1 * | 7/2004 | Fichou et al. | 370/235 |
| 6,826,147 B1 * | 11/2004 | Nandy et al. | 370/229 |

OTHER PUBLICATIONS

D. Durham, et al., "The COPS (Common Open Policy Serivce) Protocol," Jan. 2000, pp. 1-38.

S. Herzog, et al., "COPS usage for RSVP," Jan. 2000, pp. 1-17.

R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1-105.

* cited by examiner

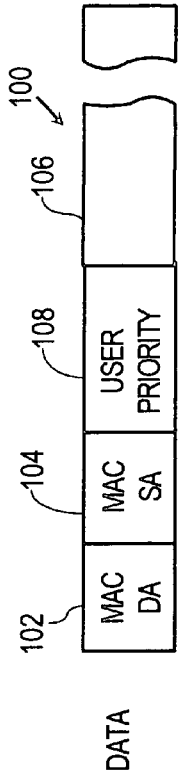
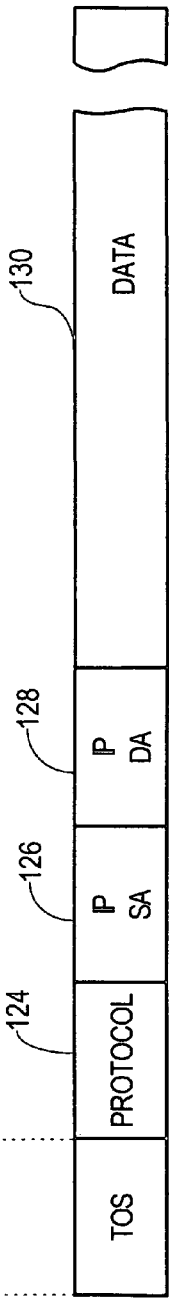
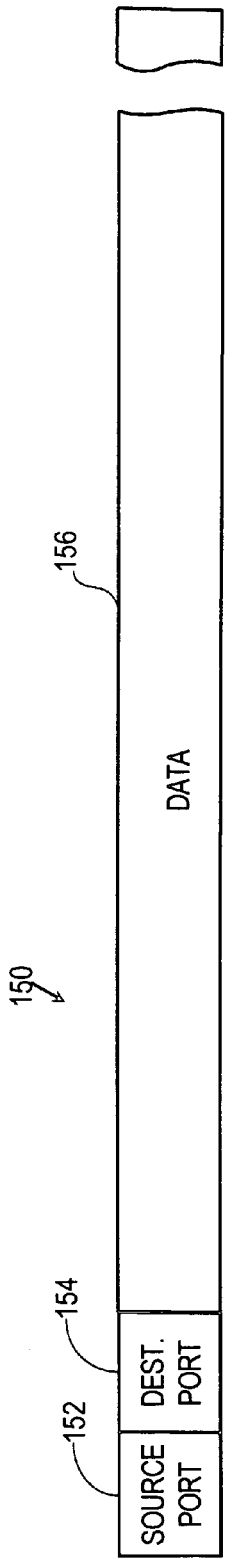
FIG. 1A (Prior Art)
FIG. 1B (Prior Art)
FIG. 1C (Prior Art)

MARKING NETWORK DATA PACKETS WITH DIFFERENTIATED SERVICES CODEPOINTS BASED ON NETWORK LOAD

FIELD OF THE INVENTION

The present invention relates generally to computer networks, and more specifically, to a method and apparatus for marking data packets with differentiated services codepoints based on network traffic load.

BACKGROUND OF THE INVENTION

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork generally known as the Internet or World Wide Web (WWW).

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP, which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are stripped off, thereby recovering the original message that is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2, which in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. Conventionally, IP data packets include a corresponding header that contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Allocation of Network Resources

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. In particular, the network administrator may want a stock quote message to be given higher priority than a print transaction. Similarly, a $1 million stock transaction message for a premium client should be assigned higher priority than a $100 stock transaction message for a standard customer.

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Additionally, the intermediate devices also include specific resources or services, such as number of priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1 p to the 802.1 D bridge standard.

FIG. 1A is a partial block diagram of a Data Link frame 100 that includes a MAC destination address (DA) field 102, a MAC source address (SA) field 104 and a data field 106. According to the 802.1 Q standard, a user_priority field 108, among others, is inserted after the MAC SA field 104. The user_priority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet 120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet.

FIG. 1C is a partial block diagram of a Transport Layer packet 150 that preferably includes a source port field 152, a destination port field 154, and a data field 156, among others. Fields 152, 154 preferably are loaded with the TCP or UDP port numbers that are utilized by corresponding network entities.

Differentiated Services

Currently, a Differentiated Services (DS) model is under development by the Internet Differentiated Services Working Group of the Internet Engineering Task Force (IETF). The main idea behind DS is the classification and possibly conditioning of traffic at network boundaries. The classification operation entails the assignment of network traffic to behavioral aggregates. The behavioral aggregates define a collection of packets with common characteristics that determine how they are identified and treated by the network.

To achieve the classification, the Internet Differentiated Services Working Group has proposed replacing the ToS field 122 of Network Layer packets 120 with a one-octet differentiated services (DS) field 132, which is assigned a differentiated services codepoint (DSCP) value between "0" and "63". (for additional details see RFC2474 "Definition of the Differentiated Services Field in the IPv4 and IPv6 Headers"). Layer 3 devices that are DS compliant ("DS nodes") apply a particular per-hop forwarding behavior to data packets based on the contents of their DS fields 132. This mechanism provides a method for dividing or allocating bandwidth of a network between the different flows, and is generally referred to as the per-hop-behavior (PHB). Examples of per-hop forwarding behaviors include expedited forwarding (EF) and assured forwarding (AF). Additional information on AF and EF forwarding can be found in RFC2597 and RFC2598.

In a typical differential services environment, DS nodes located at the border of the DS domain ("edge devices") mark or "color" each IP packet for a particular flow with a specific DSCP value based on the currently established QoS policies. Such coloring may involve loading the DS field 132 of a packet with a particular DSCP value. Thereafter, the interior DS compliant devices along the path apply the corresponding forwarding behavior to the packet based on the particular DSCP value.

For example, a QoS policy typically includes a filter or Boolean expression that indicates which packets are to be colored, and with what DSCP values. Conventionally, a network administrator selects one or more QoS policies based on a predetermined priority factor. For example, a network administrator may select a QoS policy that colors all Voice Over IP (VoIP) packets with a high priority DSCP value (for example "60") but which marks all email packets with a low priority DSCP value (for example "10"). Thus, various DSCP values may be associated with various services.

Deficiencies of Past Approaches

In general, the network administrator is responsible for defining the QoS provided within a network. Conventionally, to achieve a specified per-hop-behavior for a particular QoS, a policy management station instructs DS-compliant network nodes that are within its management domain to color each packet for a particular flow with a static DSCP value. Thereafter, the DS nodes within the DS domain forward the packets through the network based on packet's color. However, a drawback with coloring the packets for a particular flow with static DSCP values is that the per-hop-behavior that is applied to each flow does not take into account the dynamic state of the network. In particular, the then-current loading or available bandwidth of the network is not taken into account. Thus, the coloring of packets based on the static DSCP values can reduce the throughput or bandwidth that is achieved within a DS domain as unutilized bandwidth cannot be shared among the different flows. As a result, network performance suffers.

For example, an online trading application that generates stock quote messages may be assigned a DSCP value "60" that provides a target bandwidth of fifty percent (50%). Additionally, the corporate financial information messages may be assigned a DSCP value of "45" that provides a target bandwidth of forty percent (40%), while the data backup messages may be assigned a DSCP value of "15" that provides a target bandwidth of ten percent (10%). Thus, regardless of the current bandwidth that is available in the network for each particular flow, all stock quote message packets are colored with a DSCP value of "60", all corporate financial information message packets are colored with a DSCP value of "45", all data backup message packets are colored with a DSCP value of "15". Therefore, even if the network has more available bandwidth (for example because the network is not currently routing any stock quote messages), all incoming data backup message packets will be colored with the static DSCP value of "15" and thus not take advantage of the available unused bandwidth.

Moreover, the bandwidth that is allocated for each color (DSCP value) must be shared between all flows having the same color (i.e., assigned the same "Service Level"). Thus, the actual forwarding behavior that is applied to a particular flow is determined not only by the color of a particular flow (i.e., GOLD, SILVER, BRONZE, etc.), but also by the number of active flows that are currently associated with the same color (i.e., having packets with the same DSCP value).

For example, all VoIP flows may be associated with the color GOLD so that they are allocated fifty percent (50%) of the network bandwidth while all email flows may be associated with the color Bronze so that they are allocated twenty percent (20%) of the network bandwidth. However, if five VoIP flows are currently active in the network, each flow will allocated approximately ten percent (50% divided by 5 equals 10%) of the network bandwidth. In addition, if there is only one email flow that is currently active in the network, the email flow will allocated twenty percent (20% divided by 1 equals 20%) of the network bandwidth. Thus, in certain situations, a flow that is colored GOLD may actually receive less network bandwidth than a flow that is colored BRONZE.

Based on the foregoing, there is a clear need for a mechanism that can take advantage of unused network bandwidth in applying QoS within a DS domain.

There is also a need for a mechanism that takes into account the actual traffic load of the network at the time packets are colored within a DS domain.

In addition, there is also a need for mechanism that can provide a higher degree of control and predictability of the traffic patterns that exist within a network when applying a QoS within a DS domain.

SUMMARY OF THE INVENTION

According to one aspect of the invention, a method for performing load-based packet marking within a network. In this aspect, a first group of one or more packets of a data flow are marked with a first behavioral treatment value that directs devices within the network to treat the first group of one or more packets with a first quality of service treatment. The bandwidth that is currently being achieved for the flow within the network is determined based on data traffic within the network. Based on the achieved flow bandwidth within the network a second behavioral treatment value is then determined. Thereafter, a second group of one or more packets of the data flow is marked with a second behavioral treatment value that directs devices within the network to treat the second group of one or more packets with a second quality of service treatment. This process of dynamically marking the packets for a particular data flow may be performed multiple times.

According to one feature of this aspect, the step of marking a first group of one or more packets includes the step of storing a first differentiated services codepoint (DSCP) value in each header of the first group of one or more packets of a data flow; the step of determining a second behavioral treatment value includes the step of determining a second DSCP value; and the step of marking a second group of one or more packets includes the step of storing the second DSCP value in each header of the second group of one or more packets of a data flow.

According to another aspect, packet flow characteristics of the first group of one or more packets of a data flow are determined. The second behavioral treatment value is then based on both the available bandwidth within the network and the packet flow characteristics of the first group of one or more packets of a data flow.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a partial block diagram of a network message.
FIG. 1B is a partial block diagram of a network message.
FIG. 1C is a partial block diagram of a network message.

DETAILED DESCRIPTION OF THE PREFERRED EMBODIMENT

A method and apparatus for marking network data packets with differentiated services codepoints based on network load is provided. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

A load-based packet marking mechanism is provided for dynamically coloring packets of a flow based on the bandwidth that is that is actually being achieved by the flow within a network ("achieved flow bandwidth"). In one embodiment, one or more packets for a particular flow within a network are colored using an initial marking value. Thereafter, the traffic flow of the network is analyzed to determine an achieved flow bandwidth for the particular flow. Based on the achieved flow bandwidth, a new marking value is calculated and used for coloring subsequent packets within the particular flow. As will become apparent by the description below, embodiments may encompass any communication protocol. As such, the dynamic coloring of packets based on an estimate of the achieved flow bandwidth may be applied to a variety of different communication protocols. These protocols may include, but are not limited to, TCP, UDP, and RTP, in addition to a variety of other communication protocols that may be used for communicating between devices over a network.

Figure 2:
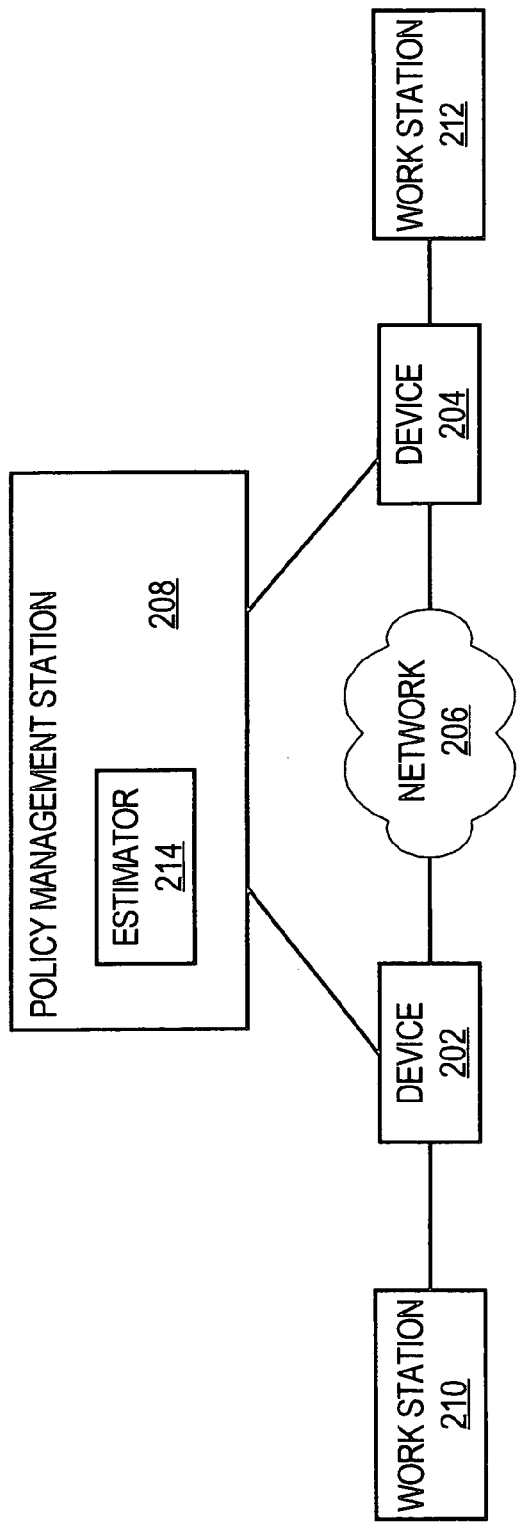
FIG. 2 is a block diagram of a computer network in which in which the present invention may be utilized.

FIG. 2 is a block diagram of a computer network 200 illustrating certain elements of an embodiment. Generally, computer network 200 includes one or more network devices 202, 204, a plurality of workstations 210, 212, a policy management station 208 and a network 206.

Network devices 202, 204 represent network edge devices such as routers, switches, or other similar or equivalent devices that are configured for coloring packets within network 206. In one embodiment, network devices 202, 204 are configured to execute the Cisco Internetworking Operating System (IOS) and capable of marking packets with DSCP values, i.e., they are compatible with Differentiated Services. Such marking may be carried out using a marker or other software element or application that runs under control of IOS, e.g., an agent or process.

Workstations 210, 212 may be personal computers, workstations, or other network end stations at which work is done, such as printers, scanners, facsimile machines, etc. In certain embodiments, workstations 210, 212 may themselves be network devices, such as bridges, gateways, routers or switches that allow computer network 200 to connect to another network system. For example, workstation 210 may be an edge device that is configured for coloring packet of a different DS domain.

Network 206 is a network system comprising any number of network devices. Network 206 may form part of a LAN or WAN. In one embodiment, network 206 is a packet-switched IP network configured as a DS domain whereby treatment of packets that flow through network 206 is controlled and managed by Policy Management Station 208 and network devices 202, 204.

Policy Management Station 208 is a computer, or a group of hardware or software components or processes that cooperate or execute in one or more computer systems. As illustrated, Policy Management Station 208 is coupled to the one or more network devices 202, 204. Policy Management Station 208 configures the network devices 202, 204 to control the coloring of packets within network 206. For example, Policy Management Station 208 may direct network device 212 to color all Voice Over IP (VoIP) packets for a particular flow with the color gold (high priority) and all File Transfer Protocol (FTP) packets of a particular flow with the color Bronze (low priority). Each color is associated with one or more QoS treatment parameters, e.g., a pre-defined DSCP value and possibly other values or characteristics. Although not depicted in FIG. 2, Policy Management Station 208 may actually be coupled to and thus communicate with the one or more network devices 202, 204 via network 206.

In one embodiment, Policy Management Station 208 provides a mechanism whereby a network administrator may define an initial QoS treatment that is applied to the different services and flows within network 206. For example, an administrator may define an initial QoS treatment for a particular flow by setting an initial DiffServ Codepoint value in the packets, by setting IP Precedence values in the packets, or by signaling using RSVP. An example of a commercial product suitable for use as Policy Management Station 208 is CiscoAssure QoS Policy Manager 1.0, commercially available from Cisco Systems, Inc.

Estimator 214 is one or more hardware or software elements that are configured for estimating the real-time runtime bandwidth that is achieved by the different flows within network 206. In one embodiment, estimator 214 communicates with devices 202, 204 to estimate the throughput, network latency, and other packet flow characteristics that are currently associated with flows within network 206. Based on these estimates, the estimator 214 determines the bandwidth that is achieved for the different flows within network 206. Policy Management Station 208 then communicates with markers or other elements of devices 202, 204 to dynamically color the packets for each flow based on the currently achieved flow bandwidth within network 206 and the bandwidth needs for each particular flow. Examples of how the achieved flow bandwidth may be determined are described in detail below.

Although the example embodiment of FIG. 2 shows two (2) workstations 210, 212 and two (2) devices 202, 204, in other practical embodiments there may be any number of such elements.

Load-Based Packet Marking

Figure 3:
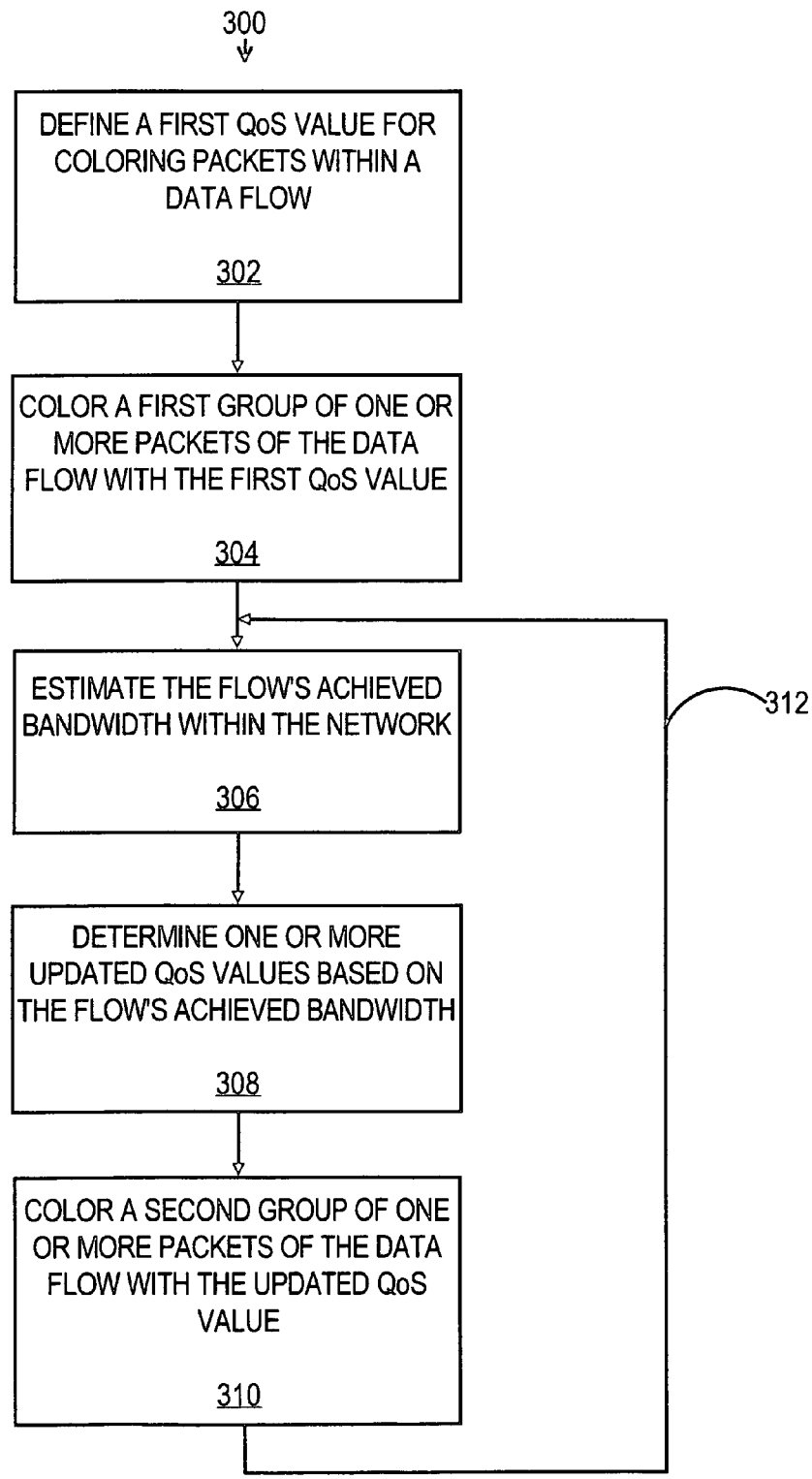
FIG. 3 is a flow diagram that illustrates a method for performing load-based packet marking.

FIG. 3 is a flow diagram 300 that illustrates a method for performing load-based packet marking in accordance with certain embodiments of the invention. For explanation purposes, the blocks of FIG. 3 are described in reference to the components of FIG. 2. However, embodiments of the methods disclosed herein are not limited to the example embodiment that is shown in FIG. 2.

At block 302, a first QoS value is defined for coloring packets within a data flow. Block 302 also may involve defining QoS values for a plurality of flows. For example, by interfacing with Policy Management Station 208 an administrator may define a QoS policy whereby VoIP packets for flow A are colored GOLD for high forwarding priority (for example allocating 60% of the network bandwidth) and FTP packets for flow B are colored BRONZE for low forwarding priority (for example allocating 20% of the network bandwidth).

At block 304, a first group of one or more packets of the data flow with the first QoS value are colored. Block 304 may involve communicating the initial QoS values to each of the edge devices so that the devices can use the values to color the packets that are associated with each of the flows. For example, in response to an administrator defining a QoS policy that colors VoIP packets for flow A to GOLD and FTP packets for flow B to BRONZE, the Policy Management Station 208 communicates the initial QoS values to edge devices 202, 204. Thereafter, edge devices 202, 204 begin applying the QoS policies by coloring the packets of each flow based on the initial QoS values.

At block 306, traffic bandwidth within the network is estimated. As described detail below, several techniques may be used to determine the achieved flow bandwidth that exists within a network. In one embodiment, estimator 214 communicates with devices 202, 204 to collect bandwidth information corresponding to the traffic patterns that currently exist in network 206.

At block 308, one or more updated QoS values are determined for coloring packets within the data flows, based on the estimated network traffic bandwidth. For example, if estimator 214 determines that the VoIP packets for flow A are consuming only 50 percent of their allocated bandwidth (i.e., 30% of the network bandwidth) and that the FTP packets of flow B are consuming 100 percent of their allocated bandwidth (i.e., 20% of the network bandwidth), estimator 214 may determine that the FTP packets of flow B should now be colored SILVER so as to have a medium forwarding priority (for example allocating 40% of the network bandwidth). In one embodiment, the estimator 214 selects the updated QoS values based on the minimal amount of service level that is required for efficiently servicing the packets for each flow. For example, if the estimator 214 determines that a third of the FTP packets for flow B are not being efficiently forwarded through the network based on the initial QoS value, the estimator 214 can generate an updated QoS value that provides for an additional 33% bandwidth for the FTP packets for flow B.

At block 310, a second group of one or more packets of the data flow are colored with the one or more updated QoS values. The updated QoS values are communicated to each of the edge devices. Thereafter, the edge devices proceed to color the packets that are associated with each of the flows based on the updated QoS values. For example, in response to communicating the updated QoS values to edge devices 202, 204, edge devices 202, 204 begin coloring the FTP packets of flow B with the color SILVER.

As illustrated in FIG. 3 by path 312, the process of dynamically updating the coloring of packets within a particular flow based on the achieved flow bandwidth can be repeated performed to continually tune the network to enhancing efficiency of a network system.

Estimating Current Achieved Flow Bandwidth

Figure 4:
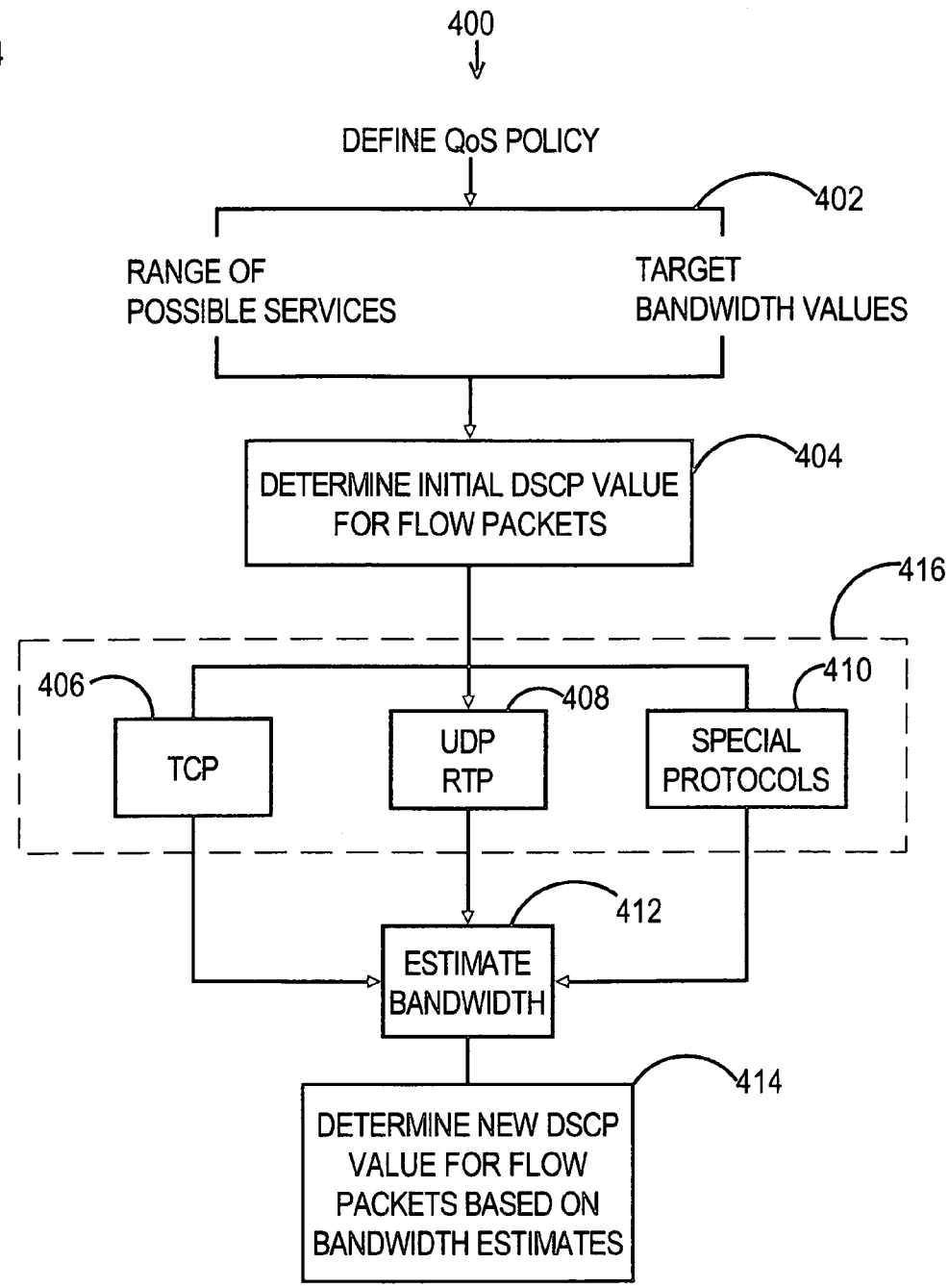
FIG. 4 is a flow diagram that illustrates additional details for dynamically coloring packets within a flow based on an estimated bandwidth that is currently available within a network system.

FIG. 4 is a flow diagram that illustrates an example of a method for dynamically coloring packets within a flow based on an estimated bandwidth that is currently being achieved by a flow within a network system. As depicted by step 402, one or more QoS policies are defined that specify target bandwidth values and a range of possible services for each flow within the network. In one embodiment, a target bandwidth identifies a specific bandwidth that is desirous or required by a particular flow within the network.

At step 404, an initial DSCP value for the packets of each flow is determined based on the defined QoS policies. The initial DSCP values are then communicated to the edge devices and initially used by the edge devices to color the packet of each flow.

At block 416, information is gathered about the currently achieved flow bandwidth within the network. Several methods may be used to gather the achieved flow bandwidth information and embodiments of the invention encompass numerous methods for gathering the achieved flow bandwidth information. For example, as depicted in steps 406, 408, 410, certain flows may contain TCP packets (TCP flow), UDP or RTP packets (RTP flow) or a variety of other special protocol packets (Special flow). In one embodiment, MIB variables are used to estimate the achieved flow bandwidth for a particular flow.

Alternatively, or in addition, other mechanisms may be used to gather current achieved flow bandwidth information for a particular flow. For example, the TCP/IP window size may be checked to determine the achieved flow bandwidth based on the initial DSCP value that is associated with the TCP flow. Based on the TCP/IP window size, the estimator 214 may update the DSCP value of the TCP flow accordingly based on the achieved flow bandwidth.

As another example, for UDP packets, the control flow protocol of the Real-Time Protocol (RTCP) may be used to determine the bandwidth that is currently being achieved by a particular flow. For example, RTP receivers may be used to provide reception quality feedback using RTCP report packets (sender report (SR) and receiver report (RR)). Each reception report block provides statistics about the data received from the particular source. Cumulative counts are used in both the sender information and receiver report blocks so that differences may be calculated between any two reports to make measurements over both short and long time periods, and to provide resilience against the loss of a report. The difference between the last two reports that were received can be used to estimate the recent quality of the distribution. In one embodiment, the Network Time Protocol (NTP) timestamp is included so that rates may be calculated from these differences over the interval between two reports. The time stamp shows the wall-clock time (absolute time) which is represented using the time stamp format of the Network Time Protocol (see RFC1305). Because the timestamp is independent of the clock rate for the data encoding, it is possible to implement encoding and profile independent quality monitors and to determine the achieved bandwidth for a particular flow. Additional information regarding the RTCP may be found in RFC1889.

At step 412, the achieved flow bandwidth for one or more flows is determined based on the gathered bandwidth information.

At step 414, updated DSCP values are determined based on the bandwidth estimates. The updated DSCP values are then applied to the corresponding packets of each flow. This process may be repeated one or more times to periodically color packets of a flow based on bandwidth that is currently being achieved for a particular flow within the network.

Hardware Example

Figure 5:
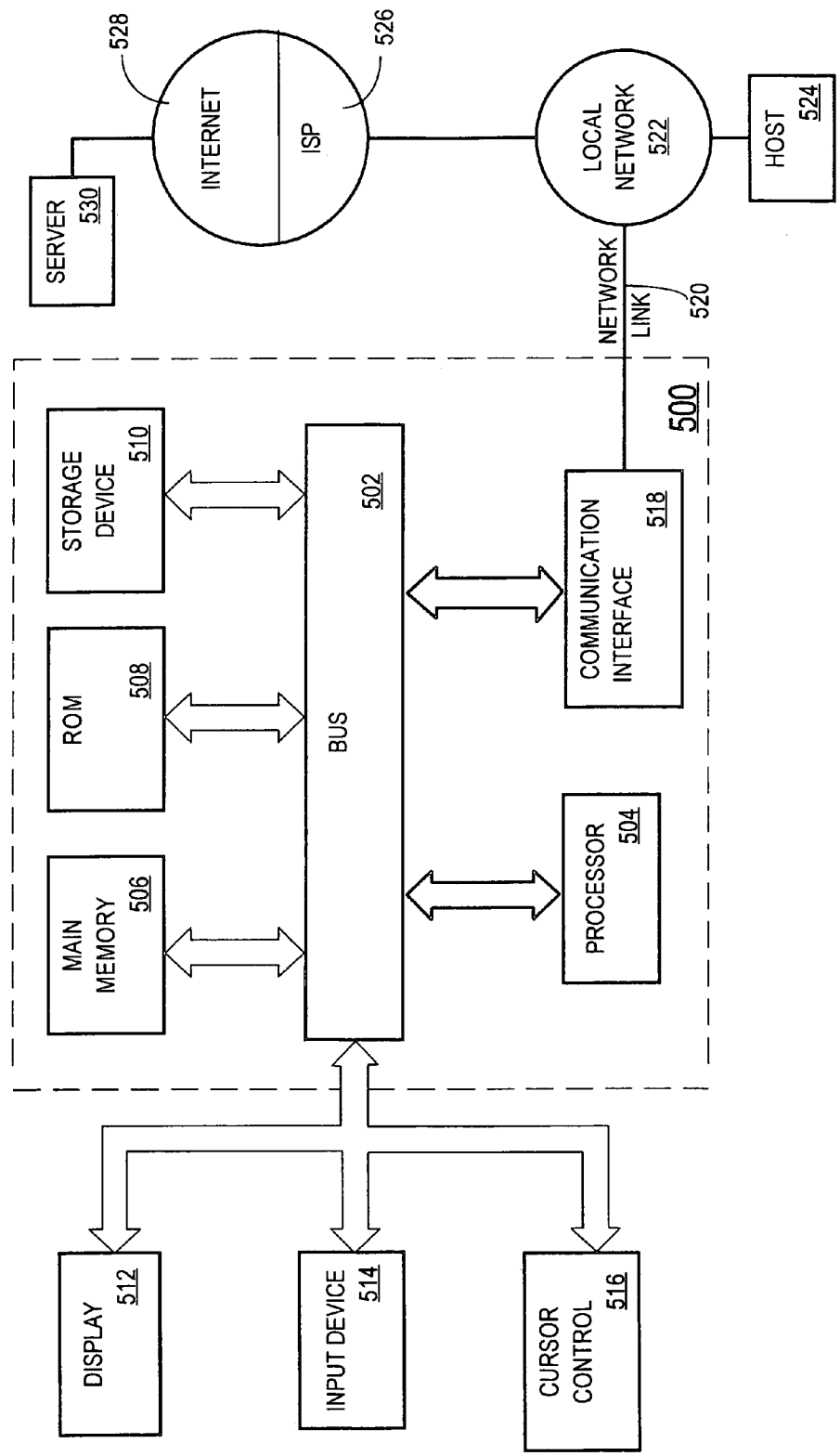
FIG. 5 is a block diagram of a computer system with which an embodiment may be carried out.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for performing load-based packet marking. According to one embodiment of the invention, load-based packet marking is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one or more such downloaded applications provide for performing load-based packet marking as described herein.

The received code may be executed by processor 504 as it is received, and/or stored in storage device 510, or other non-volatile storage for later execution. In this manner, computer system 500 may obtain application code in the form of a carrier wave.

Alternatives, Extensions

The described load-based packet marking mechanism provides for the dynamic coloring of packets for a particular flow based on the bandwidth that is currently being achieved by the particular flow within a network. By determining the current bandwidth that is actually available for a particular flow within the network, packets for the particular flow may be dynamically colored based on the current network load. Thus, the network can perform more efficiently as available bandwidth can be dynamically distributed to the different flows within the network. In one aspect, packet flow characteristics are used to identify data flows that would benefit from receiving additional bandwidth within the network and to identify data flows whose current bandwidth allocation may be reduced, at least temporarily.

In describing certain embodiments of the invention, several drawing figures have been used for explanation purposes. However, the invention is not limited to any particular context as shown in drawing figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

For example, although FIG. 2 illustrates a single policy management station 208, in certain embodiments, multiple policy management station 208 can be used for dynamically coloring packets of a particular flow based on the bandwidth that is currently being achieved by the flow within the network system.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for marking one or more packets of data in a packet-switched network based on achieved flow bandwidth information within the network, comprising the computer-implemented steps of:

receiving a first group of one or more packets of a data flow at a router in the network;

marking the first group of one or more packets of said data flow with a first behavioral treatment value, wherein the first behavioral treatment value directs devices within the network to treat the first group of one or more packets with a first quality of service treatment;

transmitting the first group of one or more packets of said data flow in the network;

determining an achieved flow bandwidth for the data flow based on data traffic within the network;

determining packet flow characteristics of the first group of one or more packets of said data flow;

determining a second behavioral treatment value based on the achieved flow bandwidth for the data flow within the network and on the packet flow characteristics of the first group of one or more packets of the data flow;

receiving a second group of one or more packets of said data flow from at the router in the network;

marking the second group of one or more packets of said data flow with said second behavioral treatment value, wherein the second behavioral treatment value directs devices within the network to treat the second group of one or more packets with a second quality of service treatment that is different than the first quality of service treatment;

transmitting the second group of one or more packets of said data flow in the network; and repeating the preceding steps for successive groups of one or more packets of said data flow, wherein each of the successive groups is dynamically marked with a behavioral treatment value that is determined based at least in part on a successively determined achieved flow bandwidth for the data flow.

2. The method as recited in claim 1, wherein:
the step of marking a first group of one or more packets includes the step of storing a first differentiated services codepoint (DSCP) value in each header of the first group of one or more packets of a data flow;
the step of determining a second behavioral treatment value includes the step of determining a second DSCP value; and
the step of marking a second group of one or more packets includes the step of storing the second DSCP value in each header of the second group of one or more packets of a data flow.

3. The method as recited in claim 1, wherein:
determining the second behavioral treatment value is further based on the available bandwidth within the network.

4. The method as recited in claim 1, further comprising the steps of:
establishing a Quality of Service (QoS) policy for applying a per-hop-behavior treatment for forwarding packets within a flow in said network; and
generating the first behavioral treatment value based on the established QoS policy.

5. The method as in claim 1, wherein the first behavioral treatment is determined without regard to the achieved flow bandwidth.

6. The method as in claim 1, wherein the second behavioral treatment is a behavioral treatment that provides a lower level of service than other available choices of behavioral treatments; and
wherein the second behavioral treatment provides a high enough level of service to accommodate the achieved flow bandwidth.

7. The method as in claim 1, wherein the second behavioral treatment is a behavioral treatment that provides a minimum level of service that is a sufficient level of service to accommodate the achieved flow bandwidth.

8. The method as in claim 1, wherein the step of marking the first group is performed by at least communicating the first behavioral treatment to a differentiated services node located at a border of a differentiated services domain; and
wherein the step of marking the second group is performed by at least communicating the second behavioral treatment to the differentiated services node.

9. The method as in claim 1, wherein the step of determining the achieved flow bandwidth is performed by at least estimating the achieved flow bandwidth based on Management Information Base (MIB) variables.

10. The method as in claim 1, wherein the step of determining the achieved flow bandwidth is performed by at least checking a Transfer Control Protocol/Internet Protocol (TCP/IP) window size and determining a value for the achieved flow bandwidth based on the TCP/IP window size.

11. The method as in claim 1, wherein the step of determining the achieved flow bandwidth is based on reception quality feedback from a Real-Time Transport Protocol (RTP) receiver.

12. The method of claim 1, wherein the data flow is associated with only one behavioral treatment at any given time.

13. The method of claim 1, wherein the achieved flow bandwidth is a percentage of the network bandwidth.

14. The method claim 13, wherein the second behavioral treatment results in the data flow having a different achieved flow bandwidth, which is a different percentage of the network bandwidth.

15. The method of claim 1, wherein the determining of the second behavioral treatment is in response to a determination of achieved flow bandwidth resulting form the determining of the achieved flow bandwidth.

16. A computer-readable medium carrying one or more sequences of instructions for marking one or more packets of data in a packet-switched network based on achieved flow bandwidth information within the network, wherein execution of the one or more sequences of instructions by one or more processors causes the one or more processors to perform the steps of:
receiving a first group of one or more packets of a data flow at a router in the network;
marking the first group of one or more packets of said data flow with a first behavioral treatment value, wherein the first behavioral treatment value directs devices within the network to treat the first group of one or more packets with a first quality of service treatment;
transmitting the first group of one or more packets of said data flow in the network;
determining an achieved flow bandwidth for the data flow based on data traffic within the network;
determining packet flow characteristics of the first group of one or more packets of said data flow;
determining a second behavioral treatment value based on the achieved flow bandwidth for the data flow within the network and on the packet flow characteristics of the first group of one or more packets of the data flow;
receiving a second group of one or more packets of said data flow at the router in the network;
marking the second group of one or more packets of said data flow with said second behavioral treatment value, wherein the second behavioral treatment value directs devices within the network to treat the second group of one or more packets with a second quality of service treatment that is different than the first quality of service treatment;
transmitting the second group of one or more packets of said data flow in the network; and
repeating the preceding steps for successive groups of one or more packets of said data flow, wherein each of the successive groups is dynamically marked with a behavioral treatment value that is determined based at least in part on a successively determined achieved flow bandwidth for the data flow.

17. The computer-readable medium as recited in claim 16, wherein:
the step of marking a first group of one or more packets includes the step of storing a first differentiated services codepoint (DSCP) value in each header of the first group of one or more packets of a data flow;
the step of determining a second behavioral treatment value includes the step of determining a second DSCP value; and
the step of marking a second group of one or more packets includes the step of storing the second DSCP value in each header of the second group of one or more packets of a data flow.

18. The computer-readable medium as recited in claim 16, wherein:
determining the second behavioral treatment value is further based on the available bandwidth within the network.

19. The computer-readable medium as recited in claim 16, further comprising instructions for performing the steps of:
   establishing a Quality of Service (QoS) policy for applying a per-hop-behavior treatment for forwarding packets within a flow in said network; and
   generating the first behavioral treatment value based on the established QoS policy.

20. The computer-readable medium as in claim 16, wherein the first behavioral treatment is determined without regard to the achieved flow bandwidth.

21. The computer-readable medium as in claim 16, wherein the second behavioral treatment is a behavioral treatment that provides a lower level of service than other available choices of behavioral treatments; and
   wherein the second behavioral treatment provides a high enough level of service to accommodate the achieved flow bandwidth.

22. The computer-readable medium as in claim 16, wherein the second behavioral treatment is a behavioral treatment that provides a minimum level of service that is a sufficient level of service to accommodate the achieved flow bandwidth.

23. The computer-readable medium as in claim 16, wherein the step of marking the first group is performed by at least communicating the first behavioral treatment to a differentiated services node located at a border of a differentiated services domain; and
   wherein the step of marking the second group is performed by at least communicating the second behavioral treatment to the differentiated services node.

24. The computer-readable medium as in claim 16, wherein the step of determining the achieved flow bandwidth is performed by at least estimating the achieved flow bandwidth based on Management Information Base (MIB) variables.

25. The computer-readable medium as in claim 16, wherein the step of determining the achieved flow bandwidth is performed by at least checking a Transfer Control Protocol/Internet Protocol (TCP/IP) window size and determining a value for the achieved flow bandwidth based on the TCP/IP window size.

26. The computer-readable medium as in claim 16, wherein the step of determining the achieved flow bandwidth is based on reception quality feedback from a Real-Time Transport Protocol (RTP) receiver.

27. The computer-readable medium of claim 16, wherein the data flow is associated with only one behavioral treatment at any given time.

28. The computer-readable medium of claim 16, wherein the achieved flow bandwidth is a percentage of the network bandwidth.

29. The computer-readable medium claim 28, wherein the second behavioral treatment results in the data flow having a different achieved flow bandwidth, which is a different percentage of the network bandwidth.

30. The computer-readable medium of claim 16, wherein the determining of the second behavioral treatment is in response to a determination of achieved flow bandwidth resulting form the determining of the achieved flow bandwidth.

31. A computer apparatus comprising:
   a processor; and
   a memory coupled to the processor, the memory containing one or more sequences of instructions for marking one or more packets of data in a packet-switched network based on achieved flow bandwidth information within the network, wherein execution of the one or more sequences of instructions by the processor causes the processor to perform the steps of:
      receiving a first group of one or more packets of a data flow from the network;
      marking the first group of one or more packets of said data flow with a first behavioral treatment value, wherein the first behavioral treatment value directs devices within the network to treat the first group of one or more packets with a first quality of service treatment;
      transmitting the first group of one or more packets of said data flow in the network;
      determining an achieved flow bandwidth for the data flow based on data traffic within the network;
      determining packet flow characteristics of the first group of one or more packets of said data flow;
      determining a second behavioral treatment value based on the achieved flow bandwidth for the data flow within the network and on the packet flow characteristics of the first group of one or more packets of the data flow;
      receiving a second group of one or more packets of said data flow from the network;
      marking the second group of one or more packets of said data flow with said second behavioral treatment value, wherein the second behavioral treatment value directs devices within the network to treat the second group of one or more packets with a second quality of service treatment that is different than the first quality of service treatment;
      transmitting the second group of one or more packets of said data flow in the network; and
      repeating the preceding steps for successive groups of one or more packets of said data flow, wherein each of the successive groups is dynamically marked with a behavioral treatment value that is determined based at least in part on a successively determined achieved flow bandwidth for the data flow;
   wherein the computer apparatus is any one of a bridge, a switch, and a router.

32. The computer apparatus as recited in claim 31, wherein:
   the step of marking a first group of one or more packets includes the step of storing a first differentiated services codepoint (DSCP) value in each header of the first group of one or more packets of a data flow;
   the step of determining a second behavioral treatment value includes the step of determining a second DSCP value; and
   the step of marking a second group of one or more packets includes the step of storing the second DSCP value in each header of the second group of one or more packets of a data flow.

33. The computer apparatus as recited in claim 31, wherein:
   determining the second behavioral treatment value is further based on the available bandwidth within the network.

34. The computer apparatus as recited in claim 31, further comprising instructions for performing the steps of:
   establishing a Quality of Service (QoS) policy for applying a per-hop-behavior treatment for forwarding packets within a flow in said network; and
   generating the first behavioral treatment value based on the established QoS policy.

35. The computer apparatus as in claim 31, wherein the first behavioral treatment is determined without regard to the achieved flow bandwidth.

36. The computer apparatus as in claim 31, wherein the second behavioral treatment is a behavioral treatment that provides a lower level of service than other available choices of behavioral treatments; and wherein the second behavioral treatment provides a high enough level of service to accommodate the achieved flow bandwidth.

37. The computer apparatus as in claim 31, wherein the second behavioral treatment is a behavioral treatment that provides a minimum level of service that is a sufficient level of service to accommodate the achieved flow bandwidth.

38. The computer apparatus as in claim 31, wherein the step of marking the first group is performed by at least communicating the first behavioral treatment to a differentiated services node located at a border of a differentiated services domain; and wherein the step of marking the second group is performed by at least communicating the second behavioral treatment to the differentiated services node.

39. The computer apparatus as in claim 31, wherein the step of determining the achieved flow bandwidth is performed by at least estimating the achieved flow bandwidth based on Management Information Base (MIB) variables.

40. The computer apparatus as in claim 31, wherein the step of determining the achieved flow bandwidth is performed by at least checking a Transfer Control Protocol/Internet Protocol (TCP/IP) window size and determining a value for the achieved flow bandwidth based on the TCP/IP window size.

41. The computer apparatus as in claim 31, wherein the step of determining the achieved flow bandwidth is based on reception quality feedback from a Real-Time Transport Protocol (RTP) receiver.

42. The computer apparatus of claim 31, wherein the data flow is associated with only one behavioral treatment at any given time.

43. The computer apparatus of claim 31, wherein the achieved flow bandwidth is a percentage of the network bandwidth.

44. The computer apparatus claim 43, wherein the second behavioral treatment results in the dataflow having a different achieved flow bandwidth, which is a different percentage of the network bandwidth.

45. The computer apparatus of claim 31, wherein the determining of the second behavioral treatment is in response to a determination of achieved flow bandwidth resulting form the determining of the achieved flow bandwidth.

46. A network device configured for marking one or more packets of data in a packet-switched network based on achieved flow bandwidth information within the network, comprising:

means for receiving a first group of one or more packets of a data flow from the network;

means for marking the first group of one or more packets of said data flow with a first behavioral treatment value, wherein the first behavioral treatment value directs devices within the network to treat the first group of one or more packets with a first quality of service treatment;

means for transmitting the first group of one or more packets of said data flow in the network;

means for determining an achieved flow bandwidth for the data flow based on data traffic within the network;

means for determining packet flow characteristics of the first group of one or more packets of said data flow;

means for determining a second behavioral treatment value based on the achieved flow bandwidth for the data flow within the network and on the packet flow characteristics of the first group of one or more packets of the data flow;

means for receiving a second group of one or more packets of said data flow from the network;

means for marking the second group of one or more packets of said data flow with said second behavioral treatment value, wherein the second behavioral treatment value directs devices within the network to treat the second group of one or more packets with a second quality of service treatment that is different than the first quality of service treatment;

means for transmitting the second group of one or more packets of said data flow in the network; and means for repeating the preceding steps for successive groups of one or more packets of said data flow, wherein each of the successive groups is dynamically marked with a behavioral treatment value that is determined based at least in part on a successively determined achieved flow bandwidth for the data flow;

wherein the network device is any one of a bridge, a switch, and a router.

47. A method for marking one or more packets of data in a packet-switched network based on achieved flow bandwidth information within the network, comprising the computer-implemented steps of:

causing one or more network devices to receive a first group of one or more packets of a data flow from the network;

causing the one or more network devices to mark the first group of one or more packets of said data flow with a first behavioral treatment value, wherein the first behavioral treatment value directs devices within the network to treat the first group of one or more packets with a first quality of service treatment;

causing the one or more network devices to transmit the first group of one or more packets of said data flow in the network;

determining an achieved flow bandwidth for the data flow based on data traffic within the network;

determining packet flow characteristics of the first group of one or more packets of said data flow;

determining a second behavioral treatment value based on the achieved flow bandwidth for the data flow within the network and on the packet flow characteristics of the first group of one or more packets of the data flow;

causing the one or more network devices to receive a second group of one or more packets of said data flow from the network;

causing the one or more network devices to mark the second group of one or more packets of said data flow with said second behavioral treatment value, wherein the second behavioral treatment value directs devices within the network to treat the second group of one or more packets with a second quality of service treatment that is different than the first quality of service treatment;

causing the one or more network devices to transmit the second group of one or more packets of said data flow in the network; and causing the one or more network devices to repeat the preceding steps for successive groups of one or more packets of said data flow, wherein each of the successive groups is dynamically marked with a behavioral treatment value that is determined based at least in part on a successively determined achieved flow bandwidth for the data flow.

48. A method for marking one or more packets of data in a packet-switched network based on achieved flow bandwidth information within the network, comprising the computer-implemented steps of:

receiving a first group of packets of a plurality of data flows at a router in the network;

marking the first group of packets of said plurality of data flows with an initial set of behavioral treatment values, wherein the initial set of behavioral treatment values direct devices within the network to treat the first group of packets with an initial set of quality of service treatments;

transmitting the first group of packets of said plurality of data flows in the network;

determining achieved flow bandwidths, wherein an achieved flow bandwidth is determined for each of the plurality of data flows based on data traffic within the network;

determining packet flow characteristics of the first group of packets of said plurality of data flows;

determining an updated set of behavioral treatment values based on the achieved flow bandwidths within the network and on the packet flow characteristics of the first group of packets;

receiving a second group of packets of said plurality of data flows at the router in the network;

after the steps of marking the first group and determining the updated set of behavioral treatment values, marking the second group packets of said plurality of data flows with said updated set of behavioral treatment values, wherein the updated set of behavioral treatment values direct devices within the network to treat the second group of packets with an updated set of quality of service treatments that is different than the initial set of quality of service treatments;

transmitting the second group of packets of said plurality of data flows in the network; and repeating the preceding steps for successive groups of packets of said plurality of data flows, wherein each of the successive groups is dynamically marked with a set of behavioral treatment values that is determined based at least in part on successively determined achieved flow bandwidths for said plurality of data flows.

49. The method as in claim 48, wherein the initial set of QoS values is an initial set of Differentiated Services Codepoint (DSCP) values;

wherein the updated set of QoS values is an updated set of DSCP values;

wherein the step of estimating traffic bandwidth further comprises the steps of:

defining one or more QoS policies that specify target bandwidth values and a range of possible services for each the plurality of data flows, wherein a given target bandwidth value is specified for the given data flow, and wherein the given target bandwidth identifies a specific bandwidth that is desirous or required by the given data flow;

gathering information about the traffic bandwidth; and determining the traffic bandwidth based on the information gathered.

50. The method of claim 48, wherein each data flow is associated with only one behavioral treatment at any given time.

51. A method for performing packet marking comprising the computer-implemented steps of:

defining an initial set of Quality of Service (QoS) values for coloring packets within a plurality of data flows, wherein each of the QoS values indicates an allocation of bandwidth;

coloring a first group of one or more packets of a given data flow selected from the plurality of data flows, without regard to an achieved flow bandwidth, by at least:

communicating the initial set of QoS values to each of one or more edge differentiated services domain nodes that are located at one or more edges of a differentiated services domain, and the one or more edge differentiated services domain nodes using one or more of the initial set of QoS values to color the first group;

estimating traffic bandwidth within the network based on bandwidth information corresponding to a current traffic pattern of the network, wherein the traffic bandwidth estimated includes an achieved flow bandwidth for the given data flow;

determining packet flow characteristics of the first group of one or more packets of the given data flow;

determining an updated set of QoS values for coloring packets within the plurality of data flows, based on the traffic bandwidth estimated and on the packet flow characteristics of the first group of one or more packets, wherein the updated set of QoS values provide lower levels of service than other available choices of QoS values, and wherein the updated set of QoS values provide a high enough level of service to accommodate the traffic bandwidth estimated;

coloring a subsequent group of one or more packets of the given data flow with the one or more of updated set of QoS values by at least:

communicating the updated set of QoS values to each of one or more edge differentiated services domain nodes, and the one or more edge differentiated services domain nodes using one or more of the updated set of QoS values to color the subsequent group; and repeating the steps of estimating traffic bandwidth, determining packet flow characteristics, determining an updated set of QoS values, and coloring a subsequent group multiple times, therein tuning the network on an ongoing basis.

52. A computer-readable medium carrying one or more sequences of instructions for marking one or more packets of data in a packet-switched network based on achieved flow bandwidth information within the network, wherein execution of the one or more sequences of instructions by one or more processors causes the one or more processors to perform the steps of:

receiving a first group of packets of a plurality of data flows at a router in the network;

marking the first group of packets of said plurality of data flows with an initial set of behavioral treatment values, wherein the initial set of behavioral treatment values direct devices within the network to treat the first group of packets with an initial set of quality of service treatments;

transmitting the first group of packets of said plurality of data flows in the network;

determining achieved flow bandwidths, wherein an achieved flow bandwidth is determined for each of the plurality of data flows based on data traffic within the network;

determining packet flow characteristics of the first group of packets of said plurality of data flows;

determining an updated set of behavioral treatment values based on the achieved flow bandwidths within the network and on the packet flow characteristics of the first group of packets;

receiving a second group of packets of said plurality of data flows at the router in the network;

after the steps of marking the first group and determining the updated set of behavioral treatment values, marking the second group packets of said plurality of data flows with said updated set of behavioral treatment values, wherein the updated set of behavioral treatment values direct devices within the network to treat the second group of packets with an updated set of quality of service treatments that is different than the initial set of quality of service treatments;

transmitting the second group of packets of said plurality of data flows in the network; and repeating the preceding steps for successive groups of packets of said plurality of data flows, wherein each of the successive groups is dynamically marked with a set of behavioral treatment values that is determined based at least in part on successively determined achieved flow bandwidths for said plurality of data flows.

53. The computer-readable medium as in claim 52, wherein the initial set of QoS values is an initial set of Differentiated Services Codepoint (DSCP) values;

wherein the updated set of QoS values is an updated set of DSCP values;

wherein the step of estimating traffic bandwidth further comprises the steps of:

defining one or more QoS policies that specify target bandwidth values and a range of possible services for each the plurality of data flows, wherein a given target bandwidth value is specified for the given data flow, and wherein the given target bandwidth identifies a specific bandwidth that is desirous or required by the given data flow;

gathering information about the traffic bandwidth; and determining the traffic bandwidth based on the information gathered.

54. The computer readable medium of claim 52, wherein each data flow is associated with only one behavioral treatment at any given time.

55. A computer-readable medium carrying one or more sequences of instructions for marking one or more packets of data in a packet-switched network based on achieved flow bandwidth information within the network, wherein execution of the one or more sequences of instructions by one or more processors causes the one or more processors to perform the steps of:

defining an initial set of Quality of Service (QoS) values for coloring packets within a plurality of data flows, wherein each of the QoS values indicates an allocation of bandwidth;

coloring a first group of one or more packets of a given data flow selected from the plurality of data flows, without regard to an achieved flow bandwidth, by at least:

communicating the initial set of QoS values to each of one or more edge differentiated services domain nodes that are located at one or more edges of a differentiated services domain, and the one or more edge differentiated services domain nodes using one or more of the initial set of QoS values to color the first group;

estimating traffic bandwidth within the network based on bandwidth information corresponding to a current traffic pattern of the network, wherein the traffic bandwidth estimated includes an achieved flow bandwidth for the given data flow;

determining packet flow characteristics of the first group of one or more packets of the given data flow;

determining an updated set of QoS values for coloring packets within the plurality of data flows, based on the traffic bandwidth estimated and on the packet flow characteristics of the first group of one or more packets, wherein the updated set of QoS values provide lower levels of service than other available choices of QoS values, and wherein the updated set of QoS values provide a high enough level of service to accommodate the traffic bandwidth estimated;

coloring a subsequent group of one or more packets of the given data flow with the one or more of updated set of QoS values by at least:

communicating the updated set of QoS values to each of one or more edge differentiated services domain nodes, and the one or more edge differentiated services domain nodes using one or more of the updated set of QoS values to color the subsequent group; and repeating the steps of estimating traffic bandwidth, determining packet flow characteristics, determining an updated set of QoS values, and coloring a subsequent group multiple times, therein tuning the network on an ongoing basis.

56. A computer apparatus comprising:

a processor; and a memory coupled to the processor, the memory containing one or more sequences of instructions for marking one or more packets of data in a packet-switched network based on achieved flow bandwidth information within the network, wherein execution of the one or more sequences of instructions by the processor causes the processor to perform the steps of:

receiving a first group of packets of a plurality of data flows from the network;

marking the first group of packets of said plurality of data flows with an initial set of behavioral treatment values, wherein the initial set of behavioral treatment values direct devices within the network to treat the first group of packets with an initial set of quality of service treatments;

transmitting the first group of packets of said plurality of data flows in the network;

determining achieved flow bandwidths, wherein an achieved flow bandwidth is determined for each of the plurality of data flows based on data traffic within the network;

determining packet flow characteristics of the first group of packets of said plurality of data flows;

determining an updated set of behavioral treatment values based on the achieved flow bandwidths within the network and on the packet flow characteristics of the first group of packets;

receiving a second group of packets of said plurality of data flows from the network;

after the steps of marking the first group and determining the updated set of behavioral treatment values, marking the second group packets of said plurality of data flows with said updated set of behavioral treatment values, wherein the updated set of behavioral treatment values direct devices within the network to treat the second group of packets with an updated set of quality of service treatments that is different than the initial set of quality of service treatments;

transmitting the second group of packets of said plurality of data flows in the network; and repeating the preceding steps for successive groups of packets of said plurality of data flows, wherein each of the successive groups is dynamically marked with a set of behavioral treatment values that is determined based at least in part on successively determined achieved flow bandwidths for said plurality of data flows;

wherein the computer apparatus is any one of a bridge, a switch and a router.

57. The computer apparatus as in claim 56, wherein the initial set of QoS values is an initial set of Differentiated Services Codepoint (DSCP) values;

wherein the updated set of QoS values is an updated set of DSCP values;

wherein the step of estimating traffic bandwidth further comprises the steps of:

defining one or more QoS policies that specify target bandwidth values and a range of possible services for each the plurality of data flows, wherein a given target bandwidth value is specified for the given data flow, and wherein the given target bandwidth identifies a specific bandwidth that is desirous or required by the given data flow;

gathering information about the traffic bandwidth; and determining the traffic bandwidth based on the information gathered.

58. The computer apparatus of claim 56, wherein each data flow is associated with only one behavioral treatment at any given time.

59. A computer apparatus comprising:

a processor; and a memory coupled to the processor, the memory containing one or more sequences of instructions for marking one or more packets of data in a packet-switched network based on achieved flow bandwidth information within the network, wherein execution of the one or more sequences of instructions by the processor causes the processor to perform the steps of:

defining an initial set of Quality of Service (QoS) values for coloring packets within a plurality of data flows, wherein each of the QoS values indicates an allocation of bandwidth;

coloring a first group of one or more packets of a given data flow selected from the plurality of data flows, without regard to an achieved flow bandwidth, by at least:

communicating the initial set of QoS values to each of one or more edge differentiated services domain nodes that are located at one or more edges of a differentiated services domain, and the one or more edge differentiated services domain nodes using one or more of the initial set of QoS values to color the first group;

estimating traffic bandwidth within the network based on bandwidth information corresponding to a current traffic pattern of the network, wherein the traffic bandwidth estimated includes an achieved flow bandwidth for the given data flow;

determining packet flow characteristics of the first group of one or more packets of the given data flow;

determining an updated set of QoS values for coloring packets within the plurality of data flows, based on the traffic bandwidth estimated and on the packet flow characteristics of the first group of one or more packets, wherein the updated set of QoS values provide lower levels of service than other available choices of QoS values, and wherein the updated set of QoS values provide a high enough level of service to accommodate the traffic bandwidth estimated;

coloring a subsequent group of one or more packets of the given data flow with the one or more of updated set of QoS values by at least:

communicating the updated set of QoS values to each of one or more edge differentiated services domain nodes, and the one or more edge differentiated services domain nodes using one or more of the updated set of QoS values to color the subsequent group; and repeating the steps of estimating traffic bandwidth, determining packet flow characteristics, determining an updated set of QoS values, and coloring a subsequent group multiple times, therein tuning the network on an ongoing basis;

wherein the computer apparatus is any one of a bridge, a switch, and a router.

* * * * *

UNITED STATES PATENT AND TRADEMARK OFFICE
CERTIFICATE OF CORRECTION

PATENT NO. : 7,096,260 B1
APPLICATION NO. : 09/675980
DATED : August 22, 2006
INVENTOR(S) : Arthur Zavalkovsky et al.

It is certified that error appears in the above-identified patent and that said Letters Patent is hereby corrected as shown below:

On the Title Page, item [56] References Cited, U.S. Patent Documents
Insert --2002/0065907 A1  Cloonan et al.
  6,611,863 B1  Banginwar
  6,718,379 B1  Krishna et al.
  6,718,380 B1  Mohaban et al.
  6,839,766 B1  Parnafes et al.
  6,959,332 B1  Zavalkovsky et al.--

Claim 1, column 12, line 55 Delete "from"

Signed and Sealed this

Sixteenth Day of September, 2008

JON W. DUDAS
*Director of the United States Patent and Trademark Office*